United States Patent
Chen et al.

(10) Patent No.: US 8,311,839 B2
(45) Date of Patent: Nov. 13, 2012

(54) DEVICE AND METHOD FOR SELECTIVE IMAGE DISPLAY IN RESPONSE TO DETECTED VOICE CHARACTERISTICS

(75) Inventors: Kuan-Jen Chen, Yilan (TW); Li-Jen Chao, Taipei County (TW); Din-Ji Tzou, Taipei (TW); Chih-Heng Chiu, Taipei (TW); Chung-Won Shu, Taipei (TW)

(73) Assignee: Transcend Information, Inc., NeiHu Dist, Taipei (TW)

( * ) Notice: Subject to any disclaimer, the term of this patent is extended or adjusted under 35 U.S.C. 154(b) by 264 days.

(21) Appl. No.: 12/776,424

(22) Filed: May 9, 2010

(65) Prior Publication Data
US 2011/0246204 A1   Oct. 6, 2011

(30) Foreign Application Priority Data
Apr. 2, 2010 (TW) ................. 99110324 A (51) Int. Cl.
*G10L 21/00* (2006.01)
*G10L 17/00* (2006.01)

(52) U.S. Cl. .................... 704/275; 704/246; 704/270

(58) Field of Classification Search .............. 704/270, 704/272, 275, 276, 246, E17.002, E17.005
See application file for complete search history.

(56) References Cited

U.S. PATENT DOCUMENTS

| | | | |
|---|---|---|---|
| 6,499,016 B1 | 12/2002 | Anderson | |
| 7,262,763 B2* | 8/2007 | Kinjo | 345/173 |
| 7,286,112 B2* | 10/2007 | Kinjo | 345/156 |
| 7,721,301 B2* | 5/2010 | Wong et al. | 719/322 |
| 7,796,190 B2* | 9/2010 | Basso et al. | 348/445 |
| 7,894,639 B2* | 2/2011 | Grim et al. | 382/118 |
| 2006/0170669 A1* | 8/2006 | Walker et al. | 345/418 |
| 2007/0263266 A1 | 11/2007 | Har'el | |
| 2007/0297786 A1 | 12/2007 | Pozniansky | |
| 2009/0278769 A1* | 11/2009 | Huang | 345/76 |
| 2009/0326956 A1* | 12/2009 | Xiao et al. | 704/275 |
| 2010/0280829 A1* | 11/2010 | Gopi et al. | 704/275 |
| 2010/0312559 A1* | 12/2010 | Jin et al. | 704/249 |

* cited by examiner

*Primary Examiner* — Jesse Pullias
(74) *Attorney, Agent, or Firm* — Winston Hsu; Scott Margo (57) ABSTRACT

An image display device includes a display unit, a storage unit, a voice receiving unit and a processing unit. The storage unit stores a plurality of image data, a plurality of voice data and a plurality of image files, wherein each of the image data is corresponding to one of the voice data respectively. The voice receiving unit receives a current voice. The processing unit judges whether the current voice is similar to one of the voice data, so as to determine one image data corresponding to the current voice. When the current voice is similar to one of the voice data, the processing unit determines whether each of the image files contains the image data corresponding to the current voice and then displays the image file(s), which contain the image data corresponding to the current voice, on the display unit.

6 Claims, 6 Drawing Sheets

DEVICE AND METHOD FOR SELECTIVE IMAGE DISPLAY IN RESPONSE TO DETECTED VOICE CHARACTERISTICS

BACKGROUND OF THE INVENTION

1. Field of the Invention

The invention relates to an image display device and method thereof and, more particularly, to an image display device and method thereof for displaying image file(s) corresponding to a current voice in real time while the current voice is detected.

2. Description of the Prior Art

With the progress and development on technology, a digital photo frame equipped with a display unit, such as Liquid Crystal Display (LCD), Organic Light Emitting Diode (OLED) or Plasma Display Panel (PDP) has come out. Due to electronic components including processing unit, storage unit, control input unit disposed in the digital photo frame, it can show several different image files in sequence. Accordingly, a variety of photo displays and space saving can be achieved.

However, if the digital photo frame is shared by people and each individual stores many image files unrelated to others in the digital photo frame, a user will see many image files unrelated to himself or herself when using the digital photo frame to display the image files and can not enjoy using the digital photo frame. Besides, although the user can classify or edit the image files stored in the digital photo frame, it will reduce user's willing to operate due to its more complicated operation.

SUMMARY OF THE INVENTION

An objective of the invention is to provide an image display device and method thereof to display image file(s) corresponding to a current voice in real time while the current voice is detected.

According to one embodiment of the invention, an image display device comprises a display unit, a storage unit, a voice receiving unit and a processing unit. The processing unit is electrically connected to the display unit, the storage unit and the voice receiving unit. The storage unit stores a plurality of image data, a plurality of voice data and a plurality of image files, wherein each of the image data is corresponding to one of the voice data respectively. The voice receiving unit receives a current voice. The processing unit judges whether the current voice is similar to one of the voice data, so as to determine the image data corresponding to the current voice. When the current voice is similar to one of the voice data, the processing unit judges whether each of the image files contains the image data corresponding to the current voice and then displays the image file(s), which contain the image data corresponding to the current voice, on the display unit.

According to another embodiment of the invention, an image display method comprises steps of: storing a plurality of image data, a plurality of voice data and a plurality of image files, wherein each of the image data is corresponding to one of the voice data respectively; receiving a current voice; judging whether the current voice is similar to one of the voice data, so as to determine the image data corresponding to the current voice; when the current voice is similar to one of the voice data, judging whether each of the image files contains the image data corresponding to the current voice; and displaying the image file(s) containing the image data corresponding to the current voice.

According to another embodiment of the invention, an image display device comprises a display unit, a storage unit, a voice receiving unit and a processing unit. The processing unit is electrically connected to the display unit, the storage unit and the voice receiving unit. The storage unit stores a plurality of image data, a plurality of voice data and a plurality of image files, wherein each of the image data is corresponding to one of the voice data respectively. The processing unit judges whether each of the image files contains at least one of the image data, so as to classify the image files into a plurality of display groups, wherein each of the display groups corresponds to one of the image data. The voice receiving unit receives a current voice. The processing unit judges whether the current voice is similar to one of the voice data so as to determine the image data as well as the display group corresponding to the current voice. When the current voice is similar to one of the voice data, the processing unit displays the image file(s) of the display group corresponding to the current voice on the display unit.

According to another embodiment of the invention, an image display method comprises steps of: storing a plurality of image data, a plurality of voice data and a plurality of image files, wherein each of the image data is corresponding to one of the voice data respectively; judging whether each of the image files contains at least one of the image data, so as to classify the image files into a plurality of display groups, wherein each of the display groups corresponds to one of the image data; receiving a current voice; judging whether the current voice is similar to one of the voice data, so as to determine the image data as well as the display group corresponding to the current voice; and when the current voice is similar to one of the voice data, displaying the image file(s) of the display group corresponding to the current voice.

According to another embodiment of the invention, an image display device comprises a display unit, a storage unit, a voice receiving unit and a processing unit. The processing unit is electrically connected to the display unit, the storage unit and the voice receiving unit. The storage unit stores a plurality of image files. The processing unit classifies the image files into a plurality of display groups according to a plurality of voice characteristics. The voice receiving unit receives a current voice. The processing unit judges whether the current voice belongs to one of the voice characteristics, so as to determine the display group corresponding to the current voice. When the current voice belongs to one of the voice characteristics, the processing unit displays the image file(s) of the display group corresponding to the current voice on the display unit.

According to another embodiment of the invention, an image display method comprises steps of: storing a plurality of image files; classifying the image files into a plurality of display groups according to a plurality of voice characteristics; receiving a current voice; judging whether the current voice belongs to one of the voice characteristics, so as to determine the display group corresponding to the current voice; and when the current voice belongs to one of the voice characteristics, displaying the image file(s) of the display group corresponding to the current voice.

According to another embodiment of the invention, an image display device comprises a display unit, a storage unit, a voice receiving unit and a processing unit. The processing unit is electrically connected to the display unit, the storage unit and the voice receiving unit. The storage unit stores a plurality of image files. At least one of the image files has a pattern related to a voice characteristic. The voice receiving unit receives a current voice. The processing unit judges whether the current voice matches the voice characteristic.

When the current voice matches the voice characteristic, the processing unit displays the at least one of the image files having the pattern on the display unit.

According to another embodiment of the invention, an image display method comprises steps of: storing a plurality of image files, at least one of the image files having a pattern related to a voice characteristic; receiving a current voice; judging whether the current voice matches the voice characteristic; and when the current voice matches the voice characteristic, displaying the at least one of the image files having the pattern.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
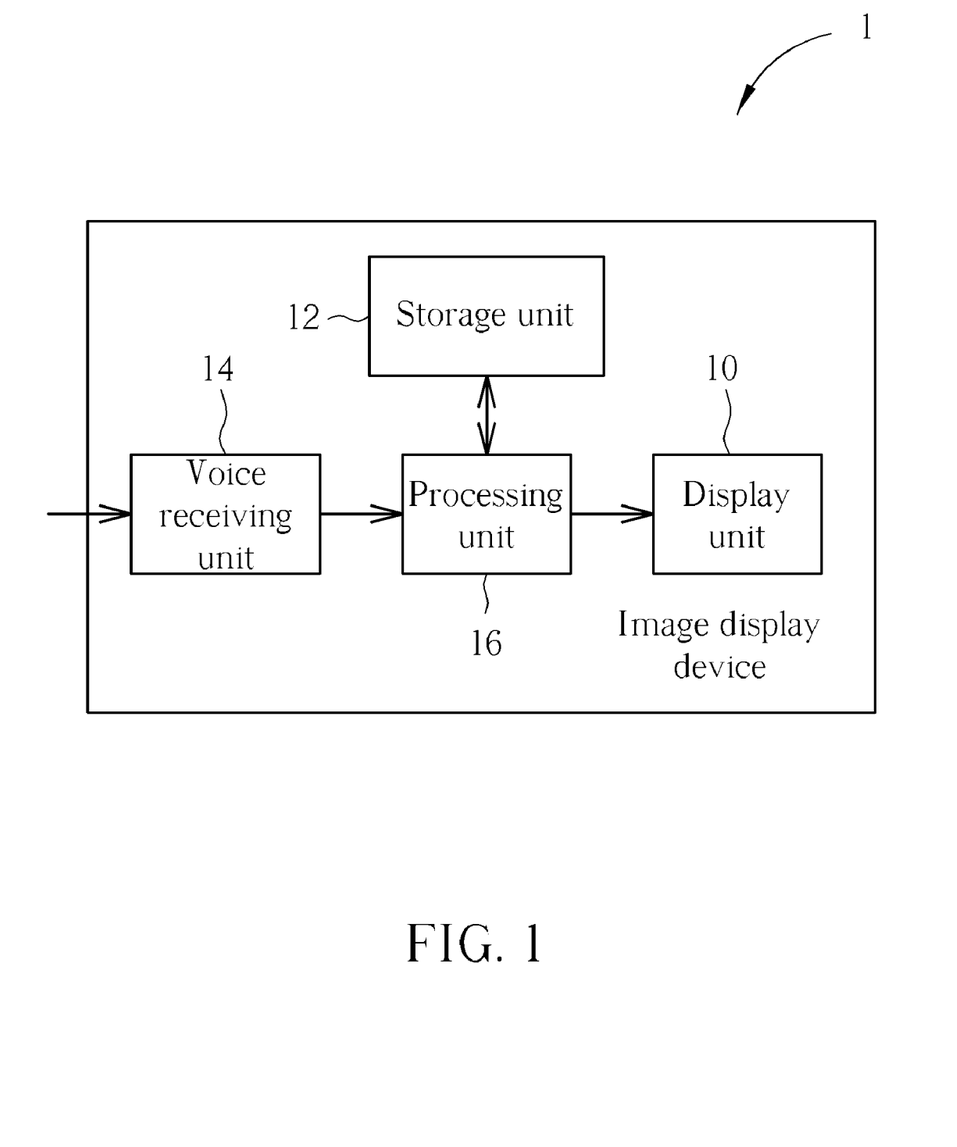
FIG. 1 is a functional block diagram illustrating an image display device 1 according to one embodiment of the invention.

Referring to FIG. 1, FIG. 1 is a functional block diagram illustrating an image display device 1 according to one embodiment of the invention. The image display device 1 can be a digital photo frame or other electronic devices with image display function. As shown in FIG. 1, the image display device 1 comprises a display unit 10, a storage unit 12, a voice receiving unit 14 and a processing unit 16. The processing unit 16 is electrically connected to the display unit 10, the storage unit 12 and the voice receiving unit 14. In practical application, the display unit 10 can be an LCD, an OLED, a PDP or any other display devices with image display function; the storage unit 12 can be a hard disc or any other storage device with data storage function; the voice receiving unit 14 can be a microphone or any other electronic component with voice receiving function; the processing unit 16 can be a Central Processing Unit (CPU) or any other processor with data calculating/processing function.

In this embodiment, the storage unit 12 can store a plurality of image data I1~In, a plurality of voice data V1~Vn and a plurality of image files IF1~IFn, wherein each of the image data I1~In is corresponding to one of the voice data V1~Vn respectively as shown in Table 1. Furthermore, the image files IF1~IFn can contain at least one of the image data I1~In as shown in Table 2.

TABLE 1

| Image Data | Voice Data |
| --- | --- |
| I1 | V1 |
| I2 | V2 |

TABLE 1-continued

| Image Data | Voice Data |
| --- | --- |
| I3 | V3 |
| ... | ... |
| In | Vn |

TABLE 2

| Image File | Image Data |
| --- | --- |
| IF1 | I1、I4 |
| IF2 | I1、I2、I5 |
| IF3 | I2、I3、I4 |
| ... | ... |
| IFn | I1、I6、I7、In |

In practical application, the image data I1~In can be head portrait data of persons P1~Pn (i.e. facial, hair characteristics and soon), the voice data V1~Vn can be voiceprint data of the persons P1~Pn, and the image files IF1~IFn can be photos of at least one of the persons P1~Pn. When using the image display device 1, a user can store the head portrait data and the voiceprint data of the persons P1~Pn in the storage unit 12. Then, the processing unit 16 converts the head portrait data and the voiceprint data of the persons P1~Pn into the image data I1~In and the voice data V1~Vn by image and voice recognition technology.

Figure 2:
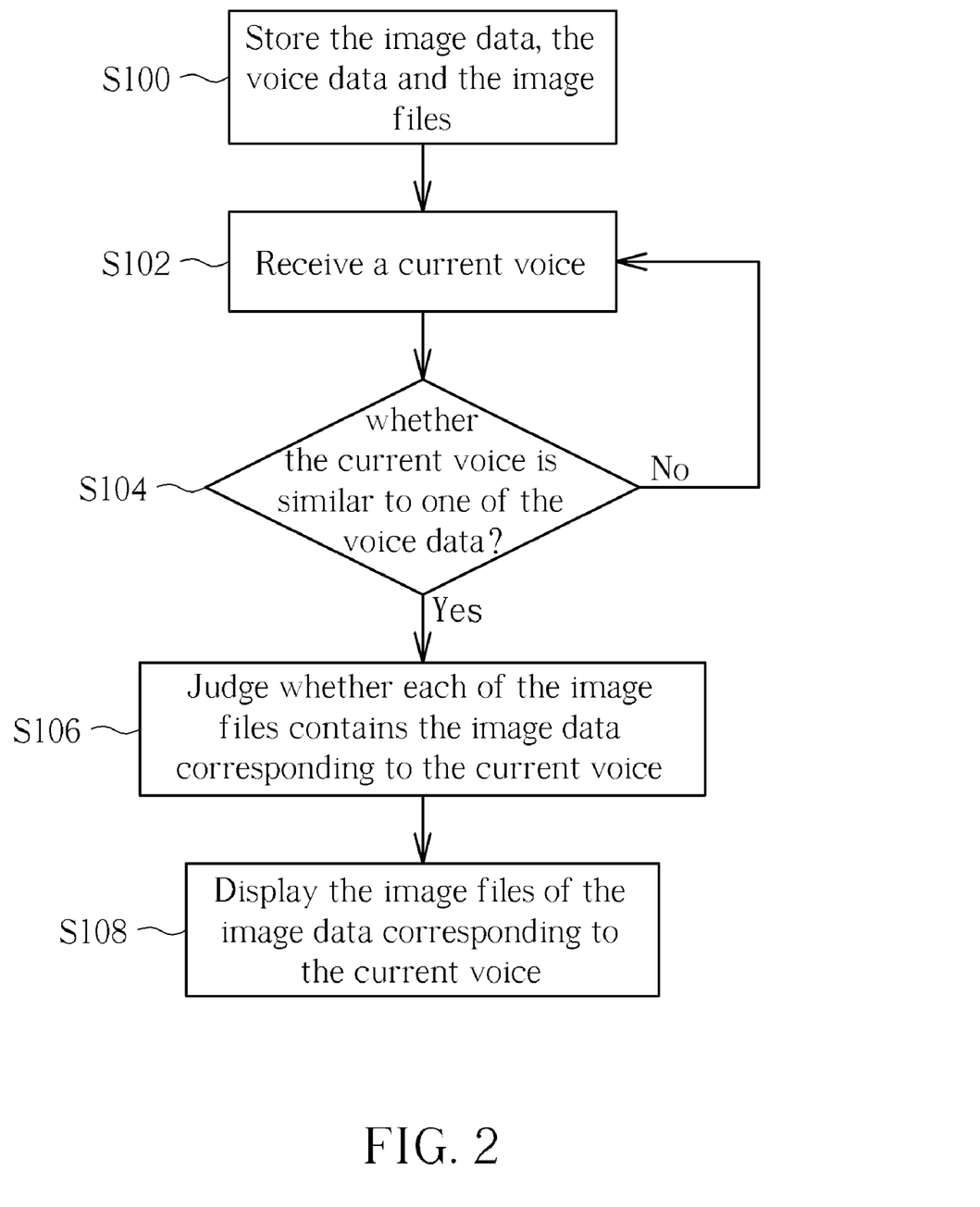
FIG. 2 is a flow chart illustrating an image display method according to one embodiment of the invention.

Referring to FIG. 2, FIG. 2 is a flow chart illustrating an image display method according to one embodiment of the invention. For example, the image display device 1 is turned on, and the image data I1~In, the voice data V1~Vn and the image files IF1~IFn are stored in the storage unit 12 (step S100). When the person P1, which is corresponding to the image data I1, speaks near the image display device 1, the voice receiving unit 14 will receive a current voice from the person P1 (step S102). In the meanwhile, the processing unit 16 judges whether the current voice is similar to one of the voice data V1~Vn by voice recognition technology, so as to determine the image data corresponding to the current voice (step S104). In this embodiment, the processing unit 16 judges the current voice is similar to the voice data V1 by voice recognition technology, and then determines the image data corresponding to the current voice is I1. Then, the processing unit 16 judges whether each of the image files IF1~IFn contains the image data I1 corresponding to the current voice by image recognition technology (step S106). In this embodiment, the processing unit 16 judges the image files IF1, IF2 and IFn contain the image data I1 corresponding to the current voice by image recognition technology. Then, the processing unit 16 will display the image files IF1, IF2 and IFn of the image data I1 (as shown in Table 2) corresponding to the current voice on the display unit 10 in sequence (step S108). The image display device 1 can be used by multi-users based on user setting or system default.

Figure 3:
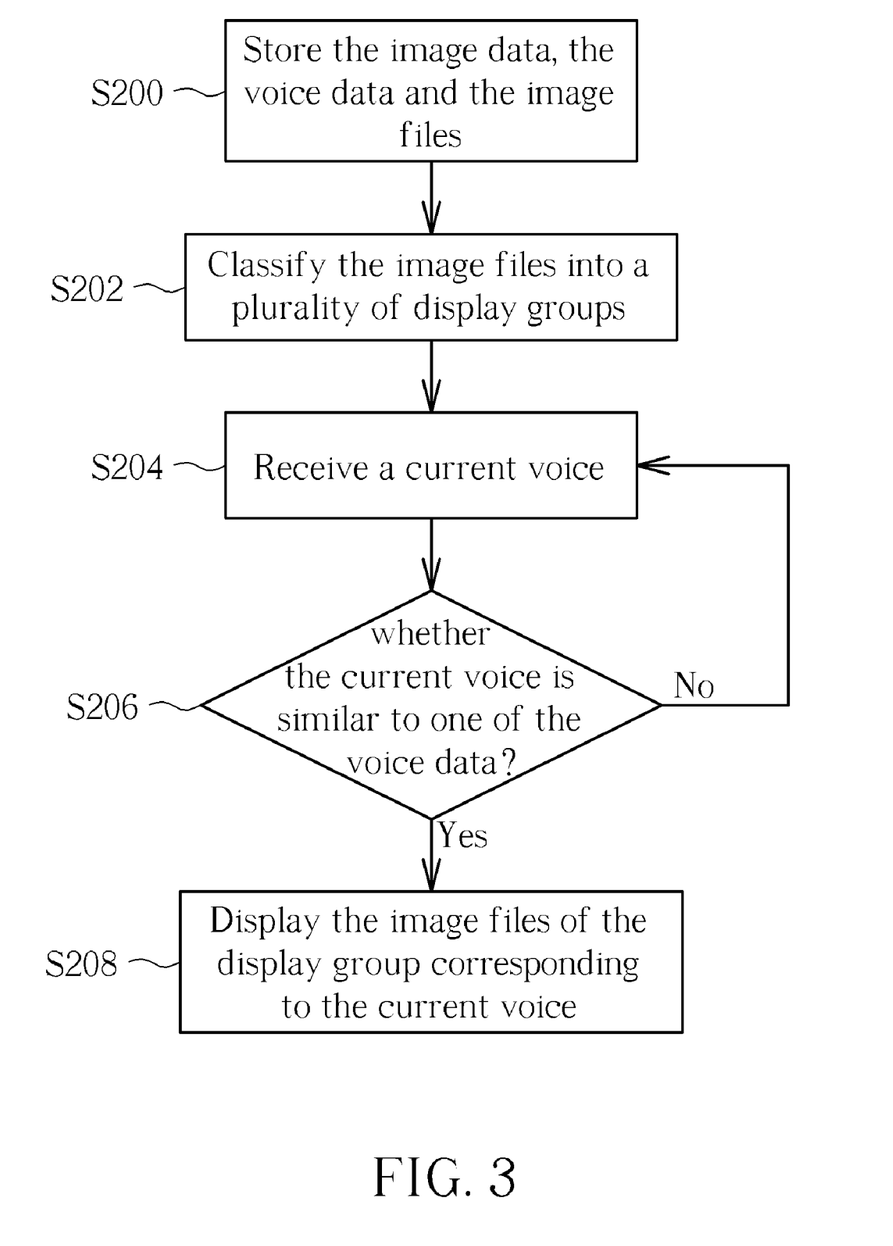
FIG. 3 is a flow chart illustrating an image display method according to another embodiment of the invention.

Referring to FIG. 3, FIG. 3 is a flow chart illustrating an image display method according to another embodiment of the invention. Referring to FIG. 1, Table 1 and Table 2 cooperatively, in this embodiment, when the storage unit 12 stores or detects the image data I1~In, the voice data V1~Vn and the image files IF1~IFn (step S200), the processing unit 16 judges whether each of the image files IF1~IFn contains at least one of the image data I1~In by image recognition technology, so as to classify the image files IF1~IFn into a plurality of display groups G1~Gn (step S202), wherein each of the display groups G1~Gn is corresponding to one of the image data I1~In, as shown in Table 3.

TABLE 3

| Display Group | Image Data | Image File |
|---|---|---|
| G1 | I1 | IF1、IF2、IFn |
| G2 | I2 | IF2、IF3 |
| G3 | I3 | IF3 |
| ... | ... | ... |
| Gn | In | IFn |

When the person P1, which is corresponding to the image data I1, speaks near the image display device 1, the voice receiving unit 14 will receive a current voice from the person P1 (step S204). In the meanwhile, the processing unit 16 judges whether the current voice is similar to one of the voice data V1~Vn by voice recognition technology, so as to determine the image data and the display group corresponding to the current voice (step S206). In this embodiment, the processing unit 16 judges the current voice is similar to the voice data V1 by voice recognition technology, and then determines the image data corresponding to the current voice is I1 and the display group is G1. Then, the processing unit 16 will display the image files IF1, IF2 and IFn of the display group G1 (as shown in Table 3) corresponding to the current voice on the display unit 10 in sequence (step S208). In this embodiment, when one new image file is stored in the storage unit 12, the processing unit 16 will (automatically) classify the new image file into the corresponding display group by image recognition technology.

Figure 4:
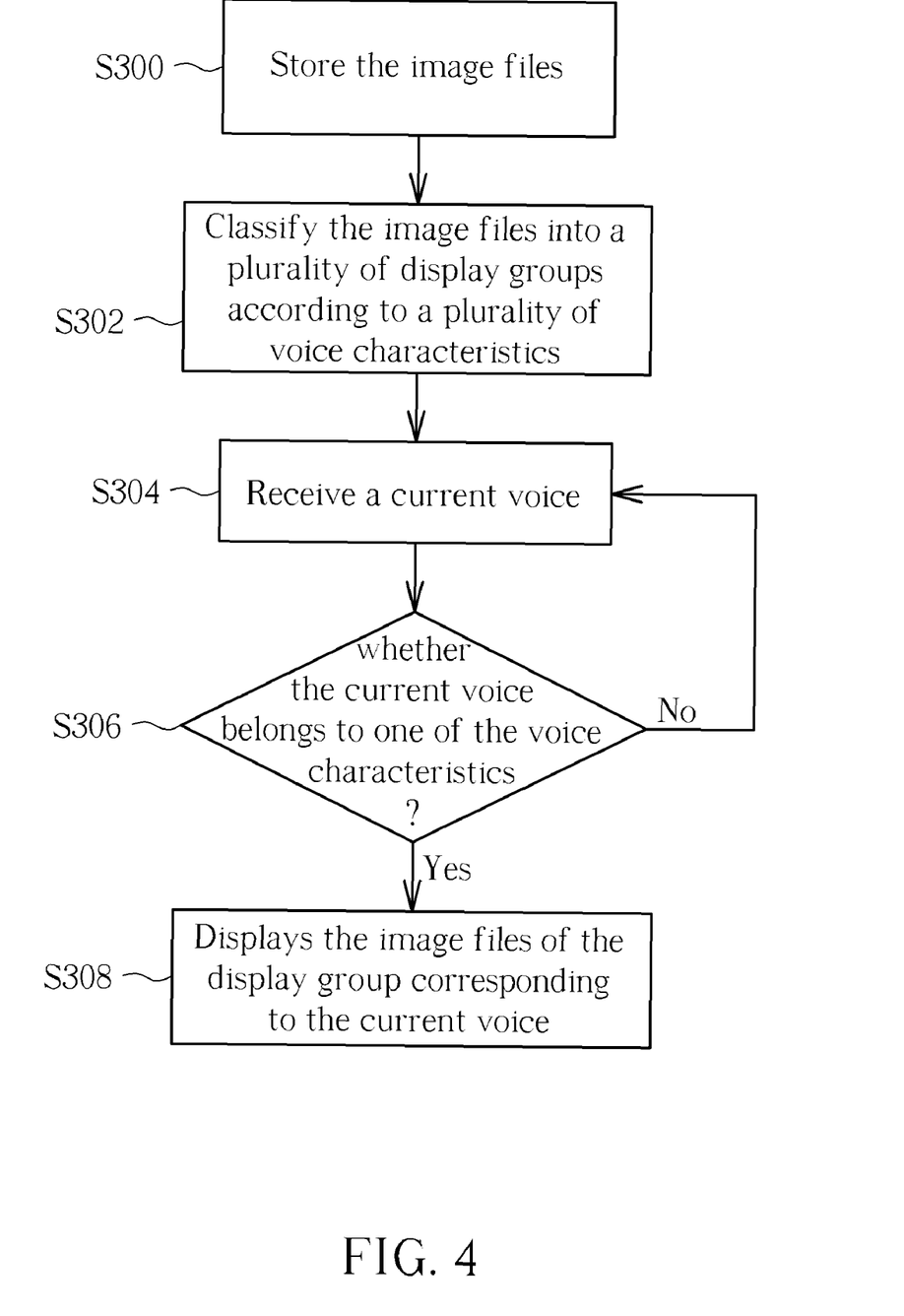
FIG. 4 is a flow chart illustrating an image display method according to another embodiment of the invention.

Referring to FIG. 4, FIG. 4 is a flow chart illustrating an image display method according to another embodiment of the invention. Referring to FIG. 1 and Table 2 cooperatively, in this embodiment, the invention can only store the image files IF1~IFn in the storage unit 12 (step S300). In the meanwhile, the processing unit 16 can (automatically) classify the image files IF1~IFn into a plurality of display groups G1~Gn according to a plurality of voice characteristics (step S302) by image recognition technology, as shown in Table 4. In this embodiment, the voice characteristics can include, but not limited to, sex, age, language, surrounding sound and specific human voice.

TABLE 4

| Voice Characteristics | | Display Group | Display File |
|---|---|---|---|
| Sex | Man | G1 | IF1、IF2、IF3 |
| | Woman | G2 | IF1、IF3、IF4 |
| Age | Child | G3 | IF1、IF2、IF5 |
| | The Young | G4 | IF1、IF5 |
| | The Old | G5 | IF5 |
| Language | English | G6 | IF2、IF7 |
| | Chinese | G7 | IF1、IF3、IF5 |
| | Japanese | G8 | IF6、IF8 |
| Surrounding Sound | Quietness | G9 | IF5 |
| | Noisiness | G10 | IF1、IF2、IF5 |
| Specific Human Voice | Person P1 | G11 | IF1、IF2、IFn |
| | Person P2 | G12 | IF2、IF3 |
| | Person P3 | G13 | IF3 |
| | ... | ... | ... |
| | Person Pn | Gn | IFn |

In this embodiment, a user can set up the image display device 1 to display the image files by himself/herself according to one of the voice characteristics. For example, if the user sets up the image display device 1 to display the image files according to the sex of the voice characteristics, and when a man speaks near the image display device 1, the voice receiving unit 14 will receive a current voice from the man (step S304). In the meanwhile, the processing unit 16 judges the voice characteristic in Table 4 to which the current voice belongs by voice recognition technology, so as to determine the display group corresponding to the current voice (step S306). In this embodiment, the processing unit 16 judges that the voice characteristic to which the current voice belongs is male of sex, and determines that the display group corresponding to the current voice is G1. Then, the processing unit 16 displays the image files IF1, IF2, IF3 of the display group G1 (as shown in Table 4) corresponding to the current voice on the display unit 10 in sequence (step S308). In other words, when one person speaks near the image display device 1, the image display device 1 will automatically display the image file(s) matching to his/her sex. In this embodiment, when one new image file is stored in the storage unit 12, the processing unit 16 can classify the new image file into the corresponding display group by image recognition technology.

Figure 5:
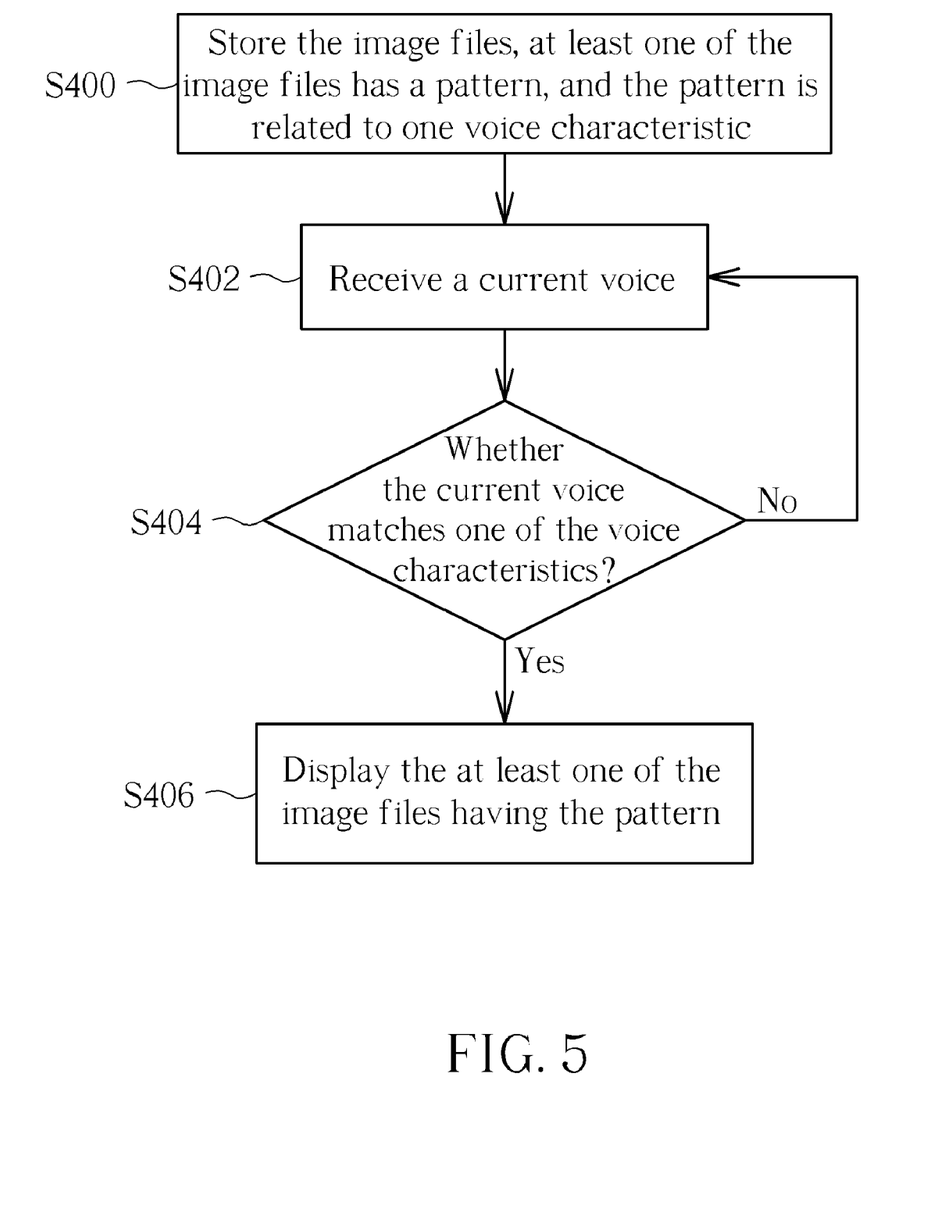
FIG. 5 is a flow chart illustrating an image display method according to another embodiment of the invention.

Referring to FIG. 5, FIG. 5 is a flow chart illustrating an image display method according to another embodiment of the invention. Referring to FIG. 1 cooperatively, in this embodiment, the invention can only store the image files IF1~IFn in the storage unit 12 (step S400). At least one of the image files IF1~IFn has a pattern, and the pattern is related to one voice characteristic, as shown in Table 5. In this embodiment, the voice characteristics can include, but not limited to, sex, age, language, surrounding sound and specific human voice. Furthermore, the pattern can be a brand or a trademark. For example, the pattern of car brand can be disposed in the image files IF1, IF2, IF3 respectively, or the pattern of toy trademark can be disposed in the image files IF1, IF2, IF5 respectively. Moreover, to determine whether the specific trademark, brand or pattern occurs in the image file can be achieved by image scan.

TABLE 5

| Image File | Pattern | Voice Characteristics | |
|---|---|---|---|
| IF1、IF2、IF3 | Car | Sex | Man |
| IF1、IF3、IF4 | Clothing | | Woman |
| IF1、IF2、IF5 | Toy | Age | Child |
| IF1、IF5 | Athletics Products | | The Young |
| IF5 | Health Food | | The Old |

In this embodiment, a user can set up the image display device 1 to display the image files by himself/herself according to one of the voice characteristics. For example, if the user sets up the image display device 1 to display the image files according to the sex of the voice characteristics, and when a man speaks near the image display device 1, the voice receiving unit 14 will receive a current voice from the man (step S402). In the meanwhile, the processing unit 16 compares the current voice with the voice characteristics in Table 5 by voice recognition technology (step S404). In this embodiment, the processing unit 16 will display the image files IF1, IF2, IF3 (as shown in Table 5) having car patterns (brands) on the display unit 10 in sequence (step S406). In other words, when one person speaks near the image display device 1, the image display device 1 will automatically display the image file(s) matching to his/her sex. In this embodiment, when one new image file is stored in the storage unit 12, the processing unit 16 can classify the image file into the corresponding display group based on the pattern of the image file.

Figure 6:
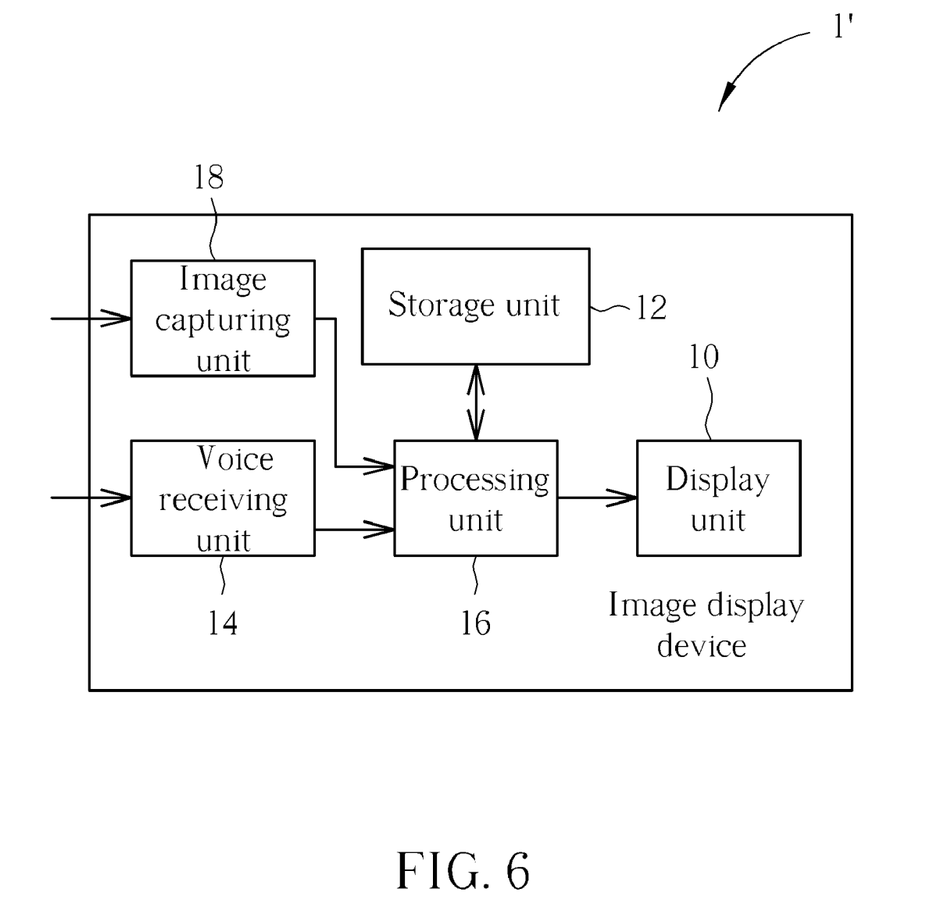
FIG. 6 is a functional block diagram illustrating an image display device 1' according to another embodiment of the invention.

Referring to FIG. 6, FIG. 6 is a functional block diagram illustrating an image display device 1' according to another embodiment of the invention. A major difference between the image display device 1' and the aforesaid image display device 1 is that the image display device 1' further comprises an image capturing unit 18 which is electrically connected to the processing unit 16. The image capturing unit 18 can be a Charge-coupled Device (CCD) image sensor or a Complementary Metal-Oxide-Semiconductor (CMOS) image sensor. Referring to FIG. 2 and FIG. 3 cooperatively, in this embodiment, when a user is near the image display device 1', the image display device 1' can not only receive a current voice from the user by the voice receiving unit 14 (step S102, step S204), but also (automatically) capture a current image from the user by the image capturing unit 18. If the processing unit 16 judges that the current voice is similar to one of the voice data in the storage unit 12 (step S104, step S206), the processing unit 16 will further judge whether the current image is similar to the image data corresponding to the current voice. When the current image is similar to the image data corresponding to the current voice, the processing unit 16 will proceed with the following steps (steps S106-S108, step S208). Accordingly, the probability of making a misjudgment can be reduced.

It should be noticed that the aforesaid embodiments related from FIG. 2 to FIG. 5 can be implemented separately or integrally.

Based on the aforesaid embodiments, the image display device and method thereof of the invention can display the image file(s) corresponding to a current voice in real time while the current voice is detected. Furthermore, the invention can classify the image files into different display groups according to different voice characteristics, such that the image files can be changed rapidly in various manners.

Those skilled in the art will readily observe that numerous modifications and alterations of the device and method may be made while retaining the teachings of the invention.

What is claimed is:

1. An image display device comprising:
    a display unit;
    a storage unit for storing a plurality of image data converted from a plurality of head portrait data of persons, a plurality of voice data converted from a plurality of voiceprint data of persons, and a plurality of image files, wherein each of the image data is corresponding to one of the voice data respectively, and each of the image files is able to contain at least one of the image data;
    a voice receiving unit for receiving a current voice; and
    a processing unit electrically connected to the display unit, the storage unit and the voice receiving unit, the processing unit judging whether the current voice is similar to one of the voice data, so as to determine the image data corresponding to the current voice, when the current voice is similar to one of the voice data, the processing unit judging whether each of the image files contains the image data corresponding to the current voice and then displaying the image file(s), which contain the image data corresponding to the current voice, on the display unit.

2. The image display device of claim 1, wherein the processing unit further comprises image and voice recognition technology to convert the plurality of head portrait data of persons and the voiceprint data of persons into the plurality of image data and the plurality of voice data.

3. An image display method comprising steps of:
    converting a plurality of head portrait data of persons into a plurality of image data;
    converting a plurality of voiceprint data of persons into a plurality of voice data, wherein each of the image data is corresponding to one of the voice data respectively;
    storing the plurality of image data and the plurality of voice data in a storage unit;
    storing a plurality of image files in the storage unit, wherein each of the plurality of image files is able to contain at least one of the plurality of image data;
    receiving a current voice;
    judging whether the current voice is similar to one of the voice data by voice recognition technology, so as to determine the image data corresponding to the current voice;
    when the current voice is similar to one of the voice data, judging whether each of the image files contains the image data corresponding to the current voice by image recognition technology; and
    displaying the image file(s) containing the image data corresponding to the current voice.

4. An image display method comprising steps of:
    storing a plurality of image data and a plurality of voice data in a storage unit, wherein each of the image data is corresponding to one of the voice data respectively;
    storing a plurality of image files in the storage unit;
    classifying the image files into a plurality of display groups by judging whether each of the image files contains at least one of the image data by image recognition technology, wherein each of the display groups is corresponding to one of the image data;
    receiving a current voice;
    judging whether the current voice is similar to one of the voice data by voice recognition technology, so as to determine the image data and the display group corresponding to the current voice
    displaying the image files of the determined display group corresponding to the current voice.

5. An image display method comprising steps of:
    storing a plurality of image files in a storage unit;
    classifying the plurality of image files into a plurality of display groups according to a plurality of voice characteristics by using image recognition technology, such that each of the plurality of display groups comprises classified image files;
    setting one of the plurality of voice characteristics for displaying;
    receiving a current voice;
    judging the set voice characteristic of the current voice by voice recognition technology;
    determining one of the plurality of display groups corresponding to the current voice according to the judging result; and
    displaying the image files classified in the determined display group.

6. The image display method of claim 3, wherein the voice characteristic is selected from a group consisting of sex, age, language, surrounding sound and specific human voice.

* * * * *